United States Patent
Le Moigne et al.

(10) Patent No.: US 9,670,962 B2
(45) Date of Patent: Jun. 6, 2017

(54) AXLEBOX COMPRISING SPLIT HOUSING PARTS, VEHICLE COMPRISING AT LEAST ONE SUCH AXLEBOX AND PROCESSES

(71) Applicants: Thierry Le Moigne, Luynes (FR); Arnaud Turmeau, Mallisard (FR)

(72) Inventors: Thierry Le Moigne, Luynes (FR); Arnaud Turmeau, Mallisard (FR)

(73) Assignee: AKTIEBOLAGET SKF, Gothenburg (SE)

( * ) Notice: Subject to any disclaimer, the term of this patent is extended or adjusted under 35 U.S.C. 154(b) by 206 days.

(21) Appl. No.: 14/551,420

(22) Filed: Nov. 24, 2014

(65) Prior Publication Data
US 2015/0144023 A1    May 28, 2015

(30) Foreign Application Priority Data
Nov. 22, 2013 (EP) .................... 13194125

(51) Int. Cl.
 *B61F 5/26* (2006.01)
 *F16C 43/00* (2006.01)
 *B61F 5/30* (2006.01)

(52) U.S. Cl.
 CPC ............... *F16C 43/00* (2013.01); *B61F 5/30* (2013.01); *Y10T 29/49696* (2015.01); *Y10T 29/49698* (2015.01)

(58) Field of Classification Search
 CPC .......... B61F 15/00; B61F 15/02; B61F 15/04; B61F 15/06; B61F 15/08; B61F 15/12; B61F 15/20; B61F 15/22; B61F 15/26; B61F 5/26; B61F 5/28
 See application file for complete search history.

(56) References Cited

U.S. PATENT DOCUMENTS

| | | | |
|---|---|---|---|
| 1,741,538 A | 12/1929 | Richards | |
| 2,424,327 A | 7/1947 | Nystrom et al. | |
| 3,091,192 A * | 5/1963 | Cope ....................... | B61F 15/06 105/221.1 |
| 3,110,269 A | 11/1963 | Lusink et al. | |
| 3,841,229 A | 10/1974 | Smith et al. | |
| 3,841,230 A | 10/1974 | Hasten, Jr. | |
| 4,043,273 A | 8/1977 | Adler | |
| 2013/0161969 A1 | 6/2013 | Le Moigne et al. | |

FOREIGN PATENT DOCUMENTS

| | | |
|---|---|---|
| EP | 0825084 A2 | 2/1998 |
| EP | 2607733 A1 | 6/2013 |

* cited by examiner

*Primary Examiner* — R. J. McCarry, Jr.
(74) *Attorney, Agent, or Firm* — Bryan Peckjian; SKF USA Inc. Patent Dept.

(57) ABSTRACT

An axlebox, comprising a first housing part, a second housing part and a bearing unit mounted therebetween, wherein the first housing part and the second housing part are connected by pivot element on one side of the bearing unit and by tightening feature on another side of the bearing unit. The invention also concerns a vehicle comprising at least one such axlebox. The invention also concerns processes for mounting, dismounting or replacing the bearing unit in such an axlebox.

14 Claims, 5 Drawing Sheets

AXLEBOX COMPRISING SPLIT HOUSING PARTS, VEHICLE COMPRISING AT LEAST ONE SUCH AXLEBOX AND PROCESSES

CROSS REFERENCE TO RELATED APPLICATION

This is a National Stage application claiming the benefit of European Union Patent Application Number EP13194125 filed on 22 Nov. 2013, which is incorporated herein by reference in its entirety.

TECHNICAL FIELD OF THE INVENTION

The invention concerns an axlebox, comprising an upper housing part, a lower housing part and a bearing unit mounted therebetween. The invention also concerns a vehicle comprising at least one such axlebox. The invention also concerns processes for mounting, dismounting or replacing the bearing unit in such an axlebox.

BACKGROUND OF THE INVENTION

Axleboxes mounted on railway vehicles such as trains, in particular on passenger coaches and freight cars, are the linking design elements between a rotating wheelset and the quasi-static frame of a bogie. An axlebox comprises a housing receiving a bearing unit. The housing is mounted for the lifetime of the bogie, by example thirty years, while the bearing is dismounted from the wheelset on a regular basis, for example every one million kilometers or every one or two years.

To facilitate maintenance operations, it is known to provide the axlebox with a split housing in two parts, by example an upper arm and a lower arm, or in three parts including a sleeve protecting the bearing unit. The split housing enables an easy radial dismounting of the wheelset, with the bearing and the axle which remain assembled.

To correctly center the bearing in the bore of the split housing, upper and lower housing parts need to be paired, especially for link arm in two parts. During maintenance, the paired parts must be packed together to avoid risk of loose.

US-A-2013/161969 discloses an example of axlebox, comprising a split housing and a bearing unit provided with a sleeve. Upper and lower housing parts constitute together a swing-arm type axlebox with a pivot plank for connection to the bogie. Upper and lower housing parts form a circular bushing for enclosing the sleeve of the bearing unit in the assembled state. Upper and lower housing parts are provided with mating through-holes for receiving bolts for closing the housing and for clamping the bearing unit.

SUMMARY OF THE INVENTION

The aim of the invention is to provide an improved axlebox.

To this end, the invention concerns an axlebox, comprising a first housing part, a second housing part and a bearing mounted therebetween. According to the invention, the first housing part and the second housing part are connected by a pivot element on one side of the bearing unit and by tightening feature on another side of the bearing unit.

Thanks to the invention, the axlebox is fast and easy to operate, in particular for mounting and dismounting the bearing unit during maintenance operations. Bearing unit is clamped between the split housing parts by tightening on one side only. Elasticity of the parts can be used to preload the bearing.

According to further aspects of the invention which are advantageous but not compulsory, such an axlebox may incorporate one or several of the following features:

- The pivot means comprises a plain bearing.
- The pivot means comprise two flanges belonging to one of the first or second housing parts, a hinge arm belonging to the other housing part and a pin extending through the hinge and the flanges.
- The pivot means comprises a rolling bearing.
- The pivot means form a detachable connection, in particular without tool, and the second housing part is movable apart from the first housing part.
- The pivot means comprises a hook formed integral with the first housing part or with the second housing part.
- The first or second housing part comprises a transverse stem provided with through holes dedicated to cooperate with the hook formed on the other housing part.
- The tightening means comprises at least one bolt.
- The tightening means comprises at least one detent pin.
- The tightening means comprises at least one rivet.
- The tightening means clamp a flange belonging to the first housing part and a flange belonging to the second housing part.
- The axlebox comprises centering means for positioning the first housing part and the second housing part relative to each other, in particular a driving pin and/or an abutment.
- The first housing part is fixed to a vehicle frame, while the second housing part is movable relative to the vehicle frame.
- The bearing unit comprises a bearing and a sleeve.

The invention also concerns a vehicle, comprising at least one axlebox as mentioned here-above. In particular, the invention concerns a railway vehicle such as a train. Preferably, the vehicle is provided with two axlebox for each wheelset.

The invention also concerns processes for mounting, dismounting a bearing unit in an axlebox as mentioned here-above.

The process for mounting the bearing unit in the axlebox comprises at least the following steps: mounting the bearing unit between the first housing part and the second housing part connected by the pivot means; and clamping the bearing unit between the first housing part and the second housing part by tightening the tightening means.

The process for dismounting the bearing unit from the axlebox comprises at least the following steps: loosening the tightening means to spread the first housing part and the second housing part connected by the pivot means; and dismounting the bearing unit from between the first housing part and the second housing part connected by the pivot means.

The process for replacing the bearing unit in the axlebox comprises at least the following steps: loosening the tightening means to spread the first housing part and the second housing part connected by the pivot means dismounting the bearing unit from between the first housing part and the second housing part connected by the pivot means; mounting a new bearing unit between the first housing part and the second housing part connected by the pivot means; and clamping the bearing unit between the first housing part and the second housing part by tightening the tightening means.

BRIEF DESCRIPTION OF THE DRAWINGS

The invention will now be explained in correspondence with the annexed figures, and as an illustrative example, without restricting the object of the invention. In the annexed figures.

DETAILED DESCRIPTION OF SOME EMBODIMENTS

Figure 1:
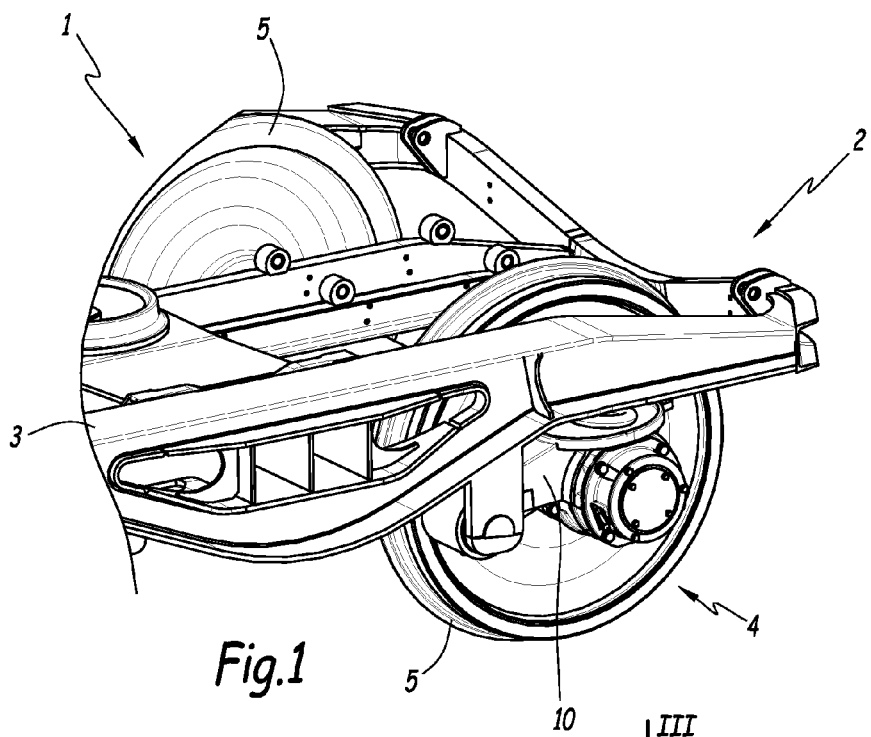
FIG. 1 is a partial perspective view of a bogie belonging to a railway vehicle according to the invention, comprising an axlebox also according to the invention.

FIG. 1 shows a bogie 2, partly represented for simplification purpose, belonging to a railway vehicle 1 according to the invention. The bogie 2 comprises a frame 3, two wheelset 4 and four axleboxes 10 according to the invention. Only one wheelset 4 and one axlebox 10 are shown on FIG. 1 for simplification purpose. The wheelset 4 comprises an axle supporting two wheels 5.

Figure 2:
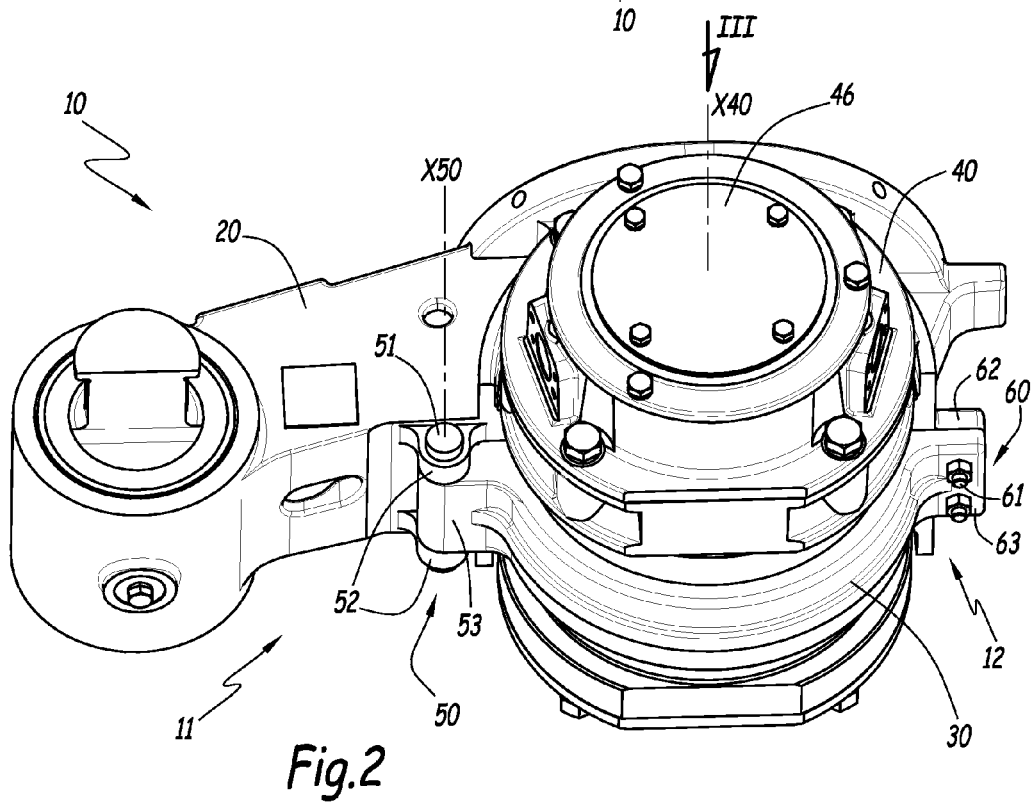
FIG. 2 is another perspective view, with another angle, showing the axlebox belonging to the railway vehicle of FIG. 1.
Figure 3:
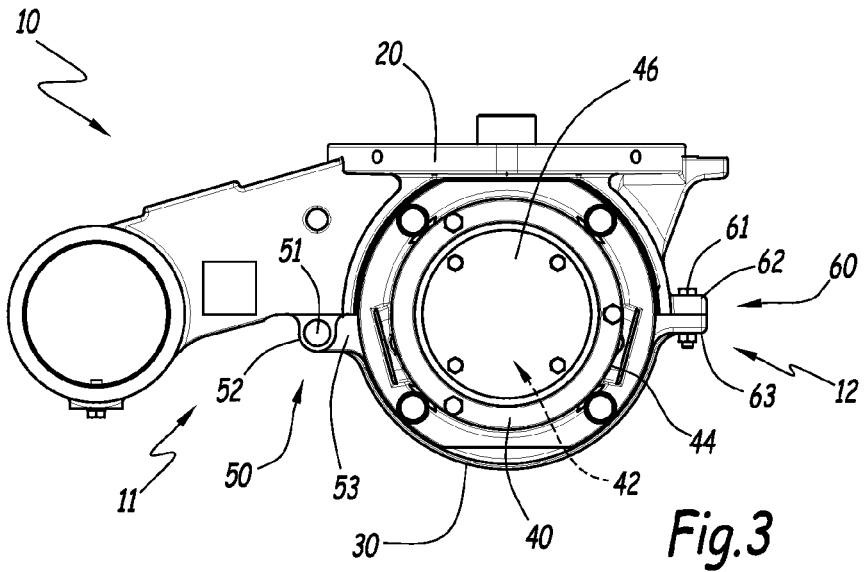
FIG. 3 is a side view of the axlebox along arrow III of FIG. 2.
Figure 4:
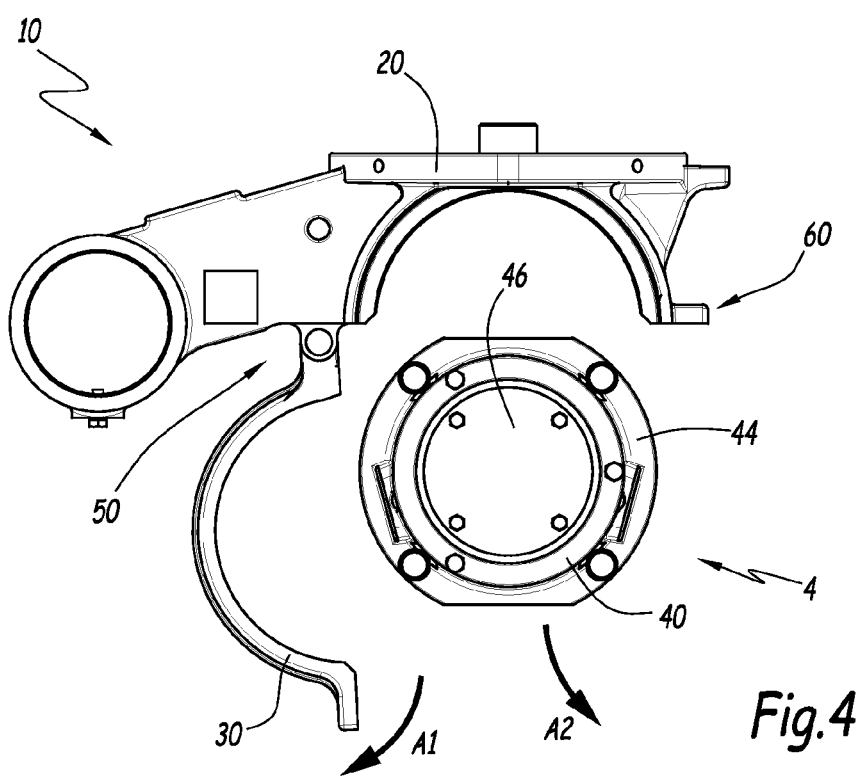
FIG. 4 is a view similar to FIG. 3, showing a wheelset being dismounted from the axlebox.
Figure 5:
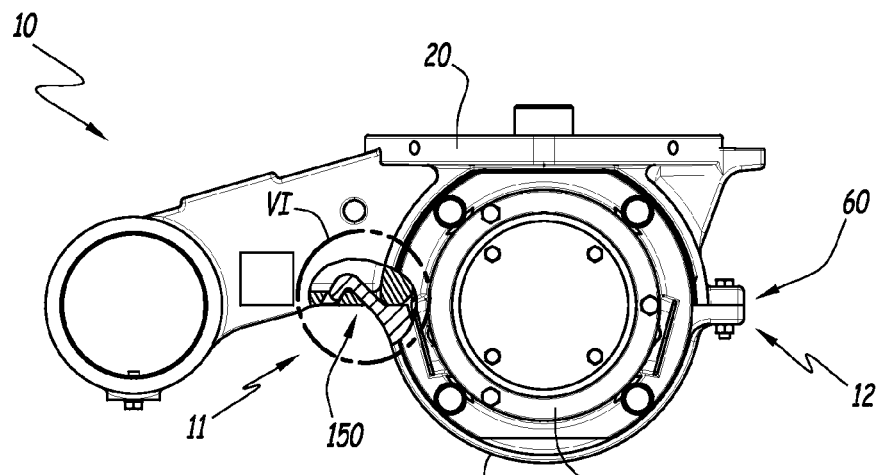
FIG. 5 is a view similar to FIG. 3, showing an axlebox according to a second embodiment of the invention, partially in sectional view.
Figure 6:
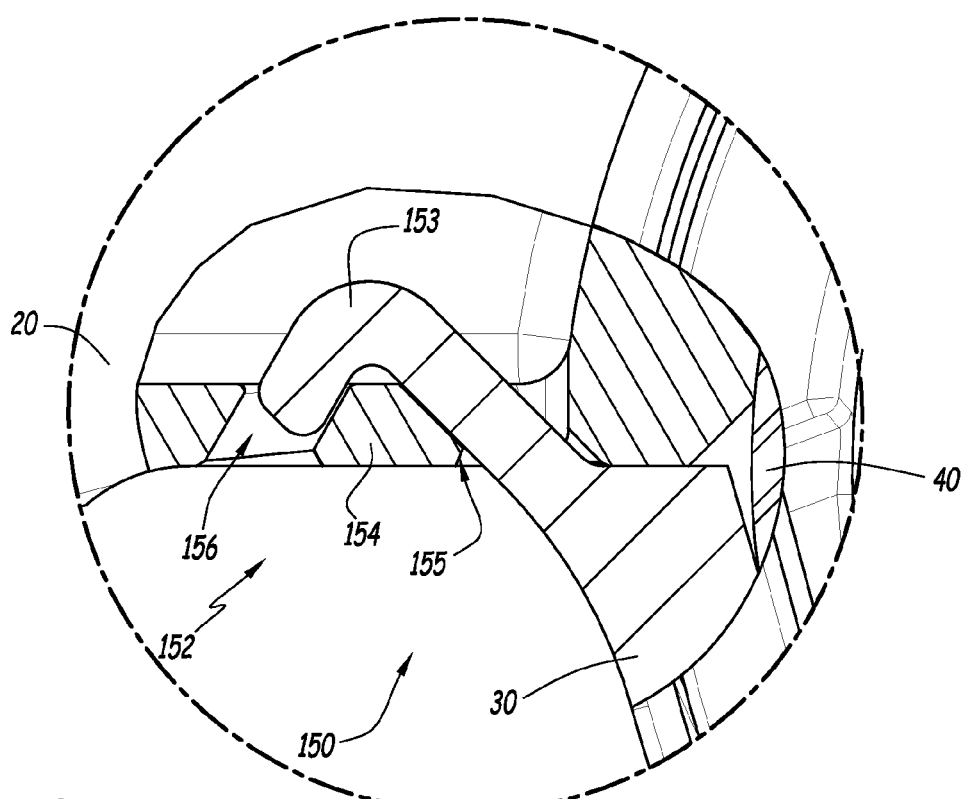
FIG. 6 is a view at a larger scale of detail VI on FIG. 5.
Figure 7:
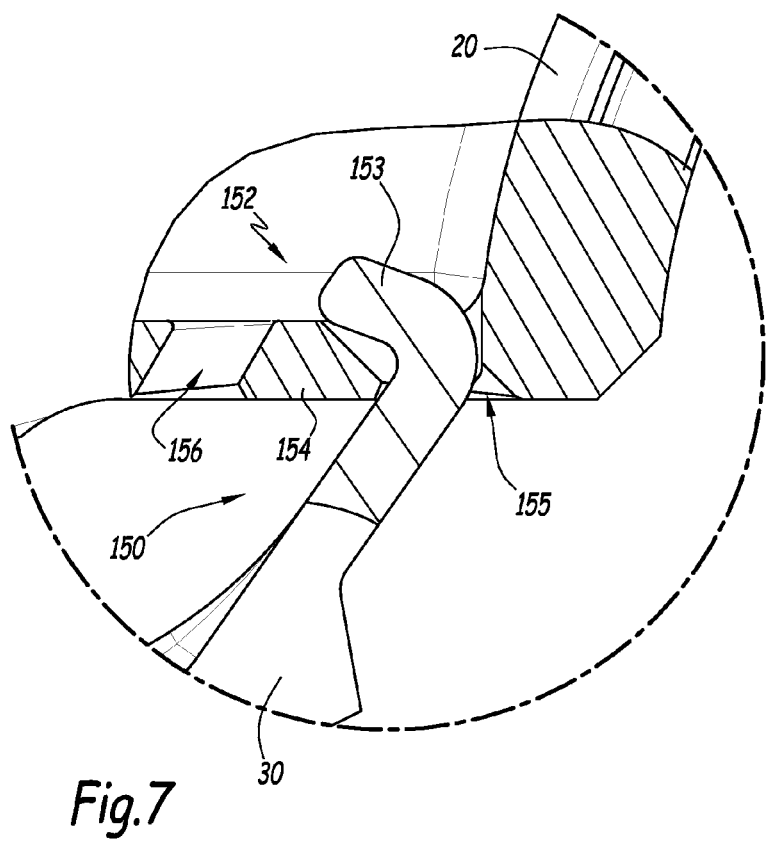
FIG. 7 is a view similar to FIG. 6, showing a wheelset being dismounted from the axlebox.
Figure 8:
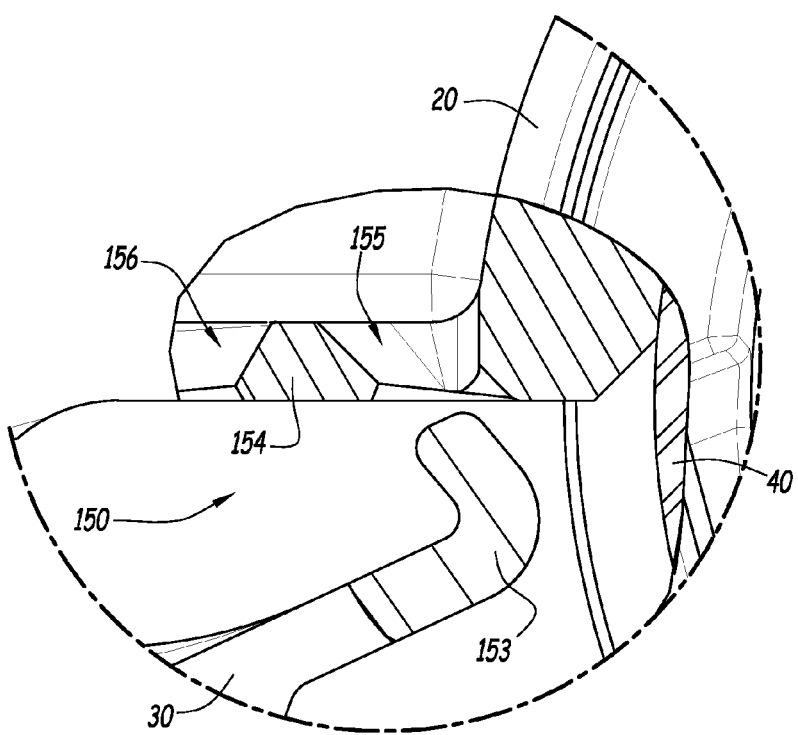
FIG. 8 is a view similar to FIG. 6, showing a lower arm being dismounted from an upper arm of the axlebox.

FIGS. 2 to 4 show the axlebox 10 of FIG. 1, comprising an upper arm 20, a lower arm 30 and a bearing unit 40 mounted therebetween.

Upper arm 20 is a first housing part fixed to the frame 3 of the bogie 2, while lower arm 30 is a second housing part 30 movable relative to the frame 3 of the bogie 2.

Bearing unit 40 comprises a bearing 42, a sleeve 44 and a cover 46. Bearing 42 is disposed inside sleeve 44 and hidden by cover 46. Bearing 42 comprises an outer ring fixed to sleeve 44 and an inner ring adapted to be mounted on the axle of wheelset 4. When bearing unit 40 is mounted in axlebox 10, sleeve 44 is clamped between arms 20 and 40.

According to the invention, upper arm 20 and lower arm 30 are connected by pivot means 50 on one side 11 of the bearing unit 40 and by tightening means 60 on another side 12 of the bearing unit 40. Sides 11 and 12 are opposed to each other radially to the axis X40 of the bearing unit 40.

Pivot means 50 comprise a pin 51, two flanges 52 belonging to the upper arm 20 and a hinge arm 53 belonging to the lower arm 30. Pin 51 extends through flanges 52 and hinge arm 53 parallel to the axis of the bearing unit 40. Pivot means 50 comprises a plain bearing formed by pin 51, flanges 52 and hinge arm 53. Pivot means 50 form a non-detachable connection between arms 20 and 30. X50 denotes the longitudinal axis of pin 51, which is parallel to axis X40. Axis X50 is a rotation axis of lower arm 30 with respect to upper arm 20.

Tightening means 60 comprise two bolts 61, a flange 62 belonging to the upper arm 20 and a flange 63 belonging to the lower arm 30. Bolts 61 are adapted to be fitted in holes formed through both flanges 62 and 63. Tightening means 60 form a detachable connection between arms 20 and 30. When bearing unit 40 is positioned between arms 20 and 30, bearing unit 40 can be clamped therebetween by tightening bolts 61 mounted through flanges 62 and 63.

Thus, axlebox 10 is quick and easy to operate, in particular for mounting and dismounting bearing unit 40 and wheelset 4 during maintenance operations. Bearing unit 40 can be clamped between the split housing parts 20 and 30 thanks to the tightening means 60 provided on side 12 only. Weight of axlebox 10 can be reduced in comparison with existing axleboxes, since no strengthened housing is required on side 11 comprising the pivot means 50. Axlebox 10 comprises fewer constitutive components that existing axleboxes.

Preferably, axlebox 10 is provided with centering means, not represented for simplification purpose, for positioning arms 20 and 30 relative to each other. By example, the centering means comprise at least one driving pin and/or at least one abutment.

The invention also concerns processes for mounting, dismounting or replacing bearing unit 40 in axlebox 10.

A mounting process comprises at least a step a) of mounting bearing unit 40 between arms 20 and 30, then a step b) of clamping bearing unit 40 between arms 20 and 30 by tightening the tightening means 60. A dismounting process comprises at least a step c) of loosening the tightening means 60 to spread arms 20 and 30, by rotation around axis X50, as shown by arrow A1 on FIG. 4, then a step d) of dismounting bearing unit 40 from between arms 20 and 30, as shown by arrow A2. A replacing process comprises at least a step e) of loosening the tightening means 60 to spread arms 20 and 30, then a step f) of dismounting bearing unit 40 from between arms 20 and 30, then a step g) of mounting a new bearing unit 40 between arms 20 and 30 and then a step h) of clamping bearing unit 40 between arms 20 and 30 by tightening the tightening means 60. Steps e) and f) are analog to steps c) and d), while steps g) and h) are analog to steps a) and b).

During all steps mentioned here-above, arms 20 and 30 are connected by the pivot means 50. Upper arm 20 is fixed to frame 3 of bogie 2, while lower arm 30 is movable in rotation around the pivot axis X50 defined by the pivot means 50. Bearing unit 40 and wheelset 4 can be quickly and easily mounted or dismounted from axlebox 10.

Figure 9:
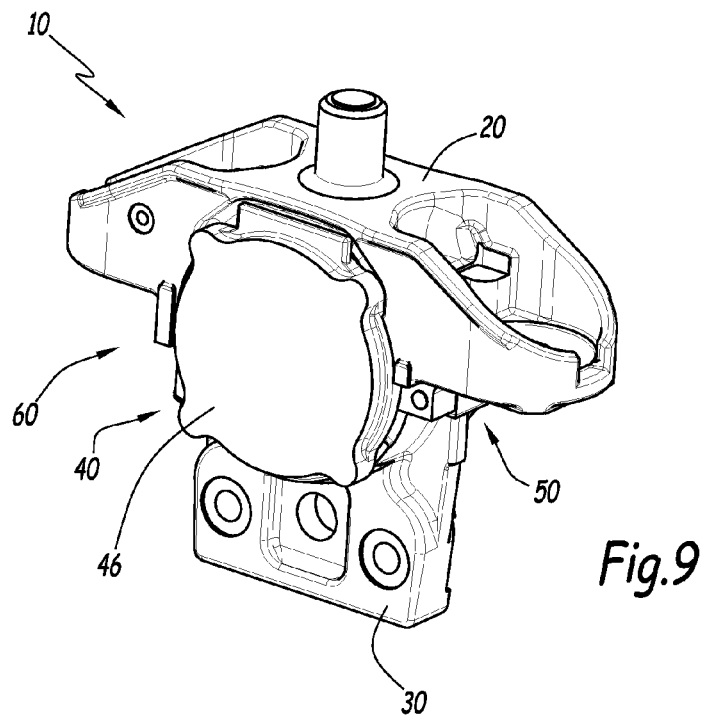
FIG. 9 is a perspective view, showing an axlebox according to a third embodiment of the invention.
Figure 10:
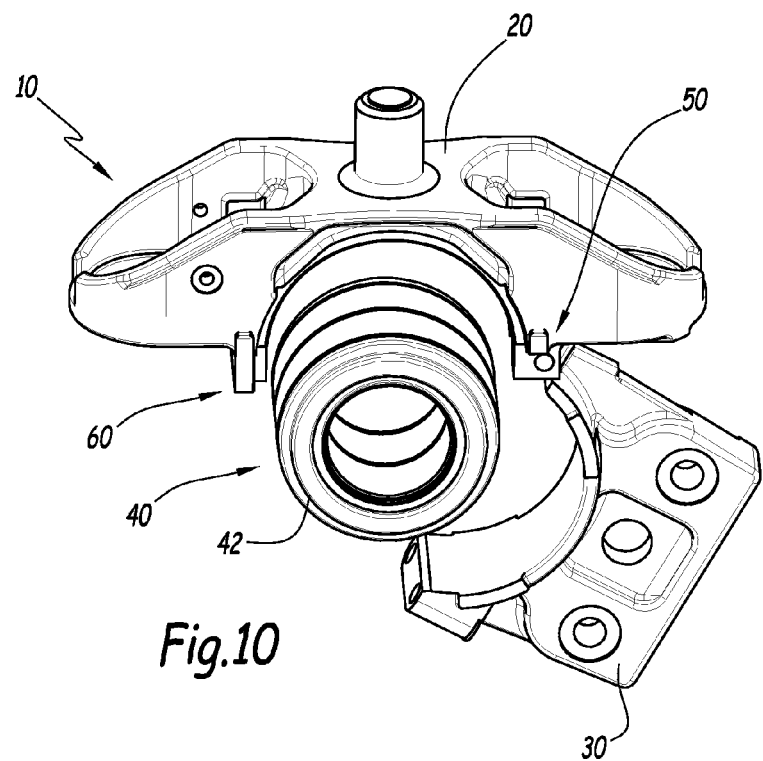
FIG. 10 is a another perspective view, with another angle, showing a bearing being dismounted from the axlebox of FIG. 9.

A second embodiment of the invention is represented on FIGS. 5 to 8, while a third embodiment of the invention is represented on FIGS. 9 and 10. In these embodiments, elements similar to the first embodiment have the same references and work in the same way. Only the differences with respect to the first embodiment are described hereafter. The processes mentioned here-above for the first embodiment apply also to the second and this embodiments.

In the embodiment represented on FIGS. 5 to 8, axlebox 10 comprises pivot means 150 including hanging means 152 belonging to the upper arm 20 and a hook 153 belonging to the lower arm 30. Hanging means 152 comprises a transverse stem 154 surrounded on both sides by two holes 155 and 156. Stem 154 is formed integral with upper arm 20, while hook 153 is formed integral with lower arm 30. Hook 153 can be hung to stem 154 or disconnected from stem 154 by passing through holes 155 and 156, as shown on FIGS. 7 and 8. Pivot means 150 form a detachable connection, in particular without using tools, between arms 20 and 30. A pre-stress can be exerted on the pivot means 150 thanks to the tightening means 60.

In the embodiment represented on FIGS. 9 and 10, bearing unit 40 comprises a bearing 42, a cover 46, but no sleeve. Bearing 42 is clamped directly between housing parts 20 and 30.

Other non-shown embodiments of the axlebox 10 can be implemented within the scope of the invention. In particular, housing parts 20 and 30, bearing unit 40, pivot means 50 and/or tightening means 60 may have different configurations.

According to a non-shown embodiment, bearing unit 40 comprises only a bearing and no other elements.

According to another non-shown embodiment, pivot means 50 comprise a rolling bearing.

According to other non-shown embodiments, tightening means 60 comprise at least one bolt, detent pin and/or rivet.

According to another non-shown embodiment, pivot means 50 and tightening means 60 may have different positions. By example, side 11 corresponding to the pivot means 50 and side 12 corresponding to the tightening means 60 have specific positions around axis X40 of the bearing unit 40 but not opposed to each other radially to this axis.

In addition, technical features of the different embodiments can be, in whole or part, combined with each other. Thus, axlebox 10 can be adapted to the specific requirements of the application.

The invention claimed is:

1. An axlebox, comprising:
a first housing part comprising an upper arm;
a second housing part comprising a lower arm; and
a bearing unit mounted therebetween,
wherein the first housing part and the second housing part are connected by a pivot element positioned at a first location on a first side of the bearing unit and by a tightening feature positioned at a second location on a second side of the bearing unit,
wherein the first location and the second location are radially opposed with respect to the bearing unit,
wherein the pivot element comprises a detachable connection between the upper arm and the lower arm, the detachable connection comprising:
a hook formed integral with the lower arm, and
a hanging element formed integral with the upper arm and comprising a transverse stem surrounded on both sides by two holes and for receiving the hook through one of the two holes and,
wherein the detachable connection enables moving and detaching the first and second housing parts.

2. The axlebox according to claim 1, wherein the pivot element comprises a plain bearing.

3. The axlebox according to claim 1, wherein the pivot element comprises a rolling bearing.

4. The axlebox according to claim 1, wherein the tightening feature comprises at least one bolt.

5. The axlebox according to claim 1, wherein the tightening feature comprises at least one detent pin.

6. The axlebox according to claim 1, wherein the tightening feature comprises at least one rivet.

7. The axlebox according to claim 1, further comprising a centering feature for positioning the first housing part and the second housing part relative to each other.

8. The axlebox according to claim 7, wherein the centering feature is at least one of a driving pin and an abutment.

9. The axlebox according to claim 1, wherein the first housing part is fixed to a vehicle frame, while the second housing part is movable relative to the vehicle frame.

10. The axlebox according to claim 1, the bearing unit further comprising a bearing and a sleeve.

11. A vehicle comprising at least one axlebox, the axlebox comprising:
a first housing part comprising an upper arm;
a second housing part comprising a lower arm; and
a bearing unit mounted therebetween,
wherein the first housing part and the second housing part are connected by a pivot element positioned at a first location on a first side of the bearing unit and by a tightening feature positioned at a second location on a second side of the bearing unit,
wherein the first location and the second location are radially opposed with respect to the bearing unit,
wherein the pivot element comprises a detachable connection between the upper arm and the lower arm, the detachable connection comprising:
a hook formed integral with the lower arm, and
a hanging element formed integral with the upper arm and comprising a transverse stem surrounded on both sides by two holes and for receiving the hook through one of the two holes and,
wherein the detachable connection enables moving and detaching the first and second housing parts,
wherein the axlebox is assembled to the vehicle.

12. A process for mounting a bearing unit in an axlebox, the process comprising:
a) obtaining the axlebox, the axlebox comprising:
a first housing part comprising an upper arm;
a second housing part comprising a lower arm; and
a bearing unit mounted therebetween,
wherein the first housing part and the second housing part are connected by a pivot element positioned at a first location on a first side of the bearing unit and by a tightening feature positioned at a second location on a second side of the bearing unit,
wherein the first location and the second location are radially opposed with respect to the bearing unit,
wherein the pivot element comprises a detachable connection between the upper arm and the lower arm, the detachable connection comprising:
a hook formed integral with the lower arm, and
a hanging element formed integral with the upper arm and comprising a transverse stem for receiving the hook surrounded on both sides by two holes,
wherein the detachable connection enables moving and detaching the first and second housing parts;
b) mounting the bearing unit between the first housing part and the second housing part connected by the pivot element; and
c) clamping the bearing unit between the first housing part and the second housing part by tightening the tightening feature.

13. A process for dismounting the bearing unit from an axlebox, the process comprising:
a) obtaining the axlebox, the axlebox comprising:
a first housing part comprising an upper arm;
a second housing part comprising a lower arm; and
a bearing unit mounted therebetween,
wherein the first housing part and the second housing part are connected by a pivot element positioned at a first location on a first side of the bearing unit and by a tightening feature positioned at a second location on a second side of the bearing unit, wherein the first location and the second location are radially opposed with respect to the bearing unit, wherein the pivot element comprises a detachable connection between the upper arm and the lower arm, the detachable connection comprising:

a hook formed integral with the lower arm, and a hanging element formed integral with the upper arm and comprising a transverse stem surrounded on both sides by two holes and for receiving the hook through one of the two holes and, wherein the detachable connection enables moving and detaching the first and second housing parts;

b) loosening the tightening feature to spread the first housing part and the second housing part connected by the pivot element; and c) dismounting the bearing unit from between the first housing part and the second housing part connected by the pivot element.

14. The process for dismounting and replacing the bearing unit in an axlebox according to claim 13, further comprising:

d) mounting a new bearing unit between the first housing part and the second housing part connected by the pivot element; and e) clamping the bearing unit between the first housing part and the second housing part by tightening the tightening feature.

* * * * *